Feb. 24, 1959   A. M. PATUREAU   2,874,574
LIQUID LEVEL MEASURING APPARATUS
Filed Aug. 13, 1954
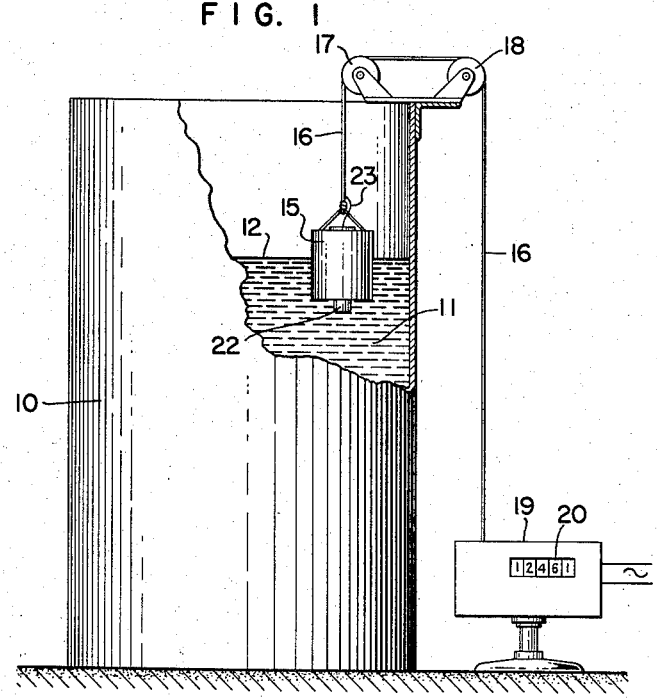
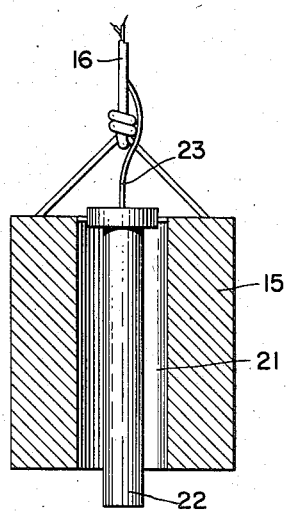
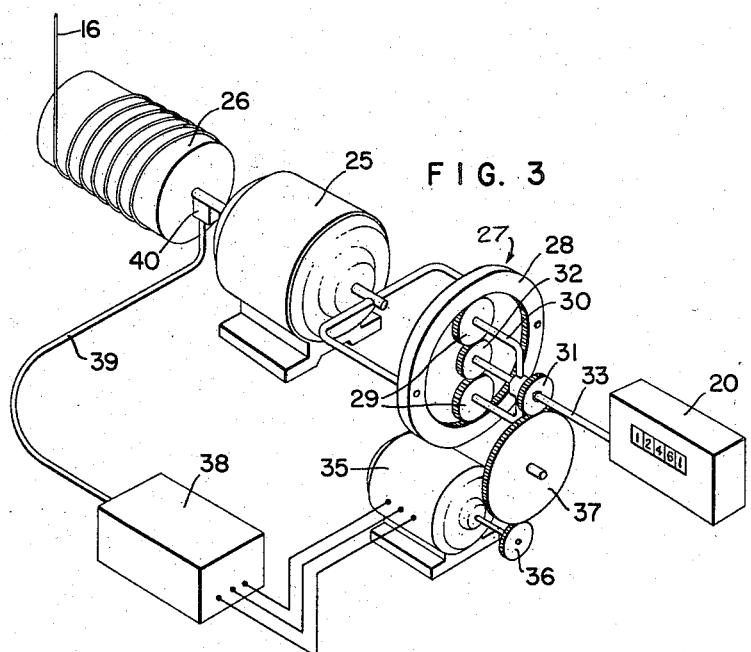
INVENTOR.
ARTHUR M. PATUREAU
BY Arthur H. Swanson
ATTORNEY.

# United States Patent Office 2,874,574
Patented Feb. 24, 1959

2,874,574

LIQUID LEVEL MEASURING APPARATUS

Arthur M. Patureau, Los Angeles, Calif., assignor to Minneapolis-Honeywell Regulator Company, Minneapolis, Minn., a corporation of Delaware Application August 13, 1954, Serial No. 449,548

5 Claims. (Cl. 73—421)

A general object of the present invention is to provide new and improved apparatus, characterized by its high accuracy, for measuring the level of a fluent material. A more specific object of the present invention is to provide in fluent material level measuring apparatus of the type employing a buoyant member means to compensate for variations in the buoyant effect of the fluent material on the buoyant member, said means including means to measure the level of the fluent material on the buoyant member.

A known method of measuring the level of a fluent material involves the use of a buoyant member or float which is buoyed up by the material to be measured. This float may be carried by a suitable supporting arm or by a cable, which arm or cable, in turn, is connected to an indicator. The use of a cable permits the indicator to be located at a remote point. A representative form of this type of level measuring device is disclosed in the McKinney Patent No. 2,629,261, issued February 24, 1953. The McKinney apparatus employs a float which is buoyed up by the fluent material whose level is to be measured. The float is carried by a cable which is connected to a suitable drum, the latter of which is connected to an indicator which will provide an indication of the level of the fluent material. The level of the fluent material as measured by the McKinney type apparatus is not absolute in that changes in the density of the fluent material will vary the buoyant effect of the material and consequently, the height of the float as it rides in the fluent material. In other words, when the density of the fluent material changes, the relative position of the float or buoyant member with respect to the surface of the fluent material will vary in accordance with the density changes. The position of the float by itself, therefore, will not accurately indicate the level of the liquid being measured.

In accordance with the principles of the present invention, means are provided for utilizing a float for obtaining a rough measurement of the level of a fluent material and additional means are provided to compensate for variations in the buoyant effect of the fluent material on the float so that a highly accurate measurement of the fluent material level may be obtained. In a preferred form, this is accomplished by providing an auxiliary level measuring device in association with the float.

It is accordingly a more specific object of the present invention to provide an improved fluent material level measuring apparatus which comprises a buoyant member adapted to be carried by the fluent material to provide a coarse measure of the fluent material level, and means to measure the level of the fluent material on the buoyant member to provide a fine measure of the level of the fluent material.

Another more specific object of the present invention is to provide a fluent material level measuring apparatus employing a buoyant member adapted to be carried by the fluent material in which there is associated with the buoyant member an additional electrical level measuring means for determining the level of the fluent material on the buoyant member.

A further more specific object of the present invention is to provide a cable supported float member wherein the cable is connected to an indicator for indicating the height of the float as it is supported by the fluent material wherein said float includes a further fluent level indicating means in the form of an electrical level measuring means which modifies the operation of the cable actuated indicator as required to compensate for variations in the buoyant effect of the fluent material.

The various features of novelty which characterize the invention are pointed out with particularity in the claims annexed to and forming a part of this specification. For a better understanding of the invention, its advantages, and specific objects attained with its use, reference should be had to the accompanying drawings and descriptive matter in which there is illustrated and described preferred embodiments of the invention.

Of the drawings:

Fig. 1 is a schematic showing of a fluent material measuring apparatus;

Fig. 2 shows in greater detail the construction of the buoyant member or float of the invention; and Fig. 3 shows a representative form of indicator mechanism.

Referring now to Fig. 1, the numeral 10 represents a tank wherein it is desired to measure the level of some fluent material 11. In most instances, the fluent material will take the form of a liquid such as water, oil, or the like. Buoyed up at the surface 12 of the liquid 11 is a float or buoyant member 15. This buoyant member is supported by a cable 16 which passes over a pair of pulleys 17 and 18 to an indicating mechanism 19. The indicating mechanism 19 includes a suitable scale 20 for indicating the liquid level. The indicator mechanism 19 may also include a suitable signal transmitting means for transmitting the indication to some remote point.

As shown in Fig. 1, and as shown in cross sectional detail in Fig. 2, the float 15 comprises a buoyant material of cylindrical cross section with a hollow portion at 21. This hollow portion 21 has mounted therein a second fluent material level measuring device 22. This second fluent level measuring device may take several different forms. One preferred form is a capacity type of level measuring device such as disclosed in the C. R. Schafer et al. Patent, 2,563,280, issued August 7, 1951. The electrical connections to the level measuring device 22 is by way of an electrical cable 23 which may be a part of the cable 16.

Representative details of the indicator mechanism 19 are shown in Fig. 3. Here, a motor 25 is used to control a drum 26 upon which the cable 16 is wound. At the other end of the motor 25 is a ring gear 28 of a planetary gear system which is adjusted by the motor 25, a pair of planetary gears 29, connected together by a yoke 30 to a driving gear 31, and a sun gear 32. The sun gear is connected to the shaft 33 which leads to the indicator 20. The drive gear 31 associated with the yoke 30 and planetary gears 29 is driven by a motor 35 through gears 36 and 37. The motor 35 is in turn controlled by an amplifier 38 which has an input signal cable 39 connected to the electrical signal from the electrical cable 23 which is a part of the cable 16 wound upon the drum. The pickoff from the drum may be by suitable slip rings as indicated generally at 40. The amplifier 38 and motor 35 may be of the type used in the above mentioned Shafer et al. patent. The drum 26, motor 25 and planetary gear system 27 may be of the type disclosed in the above mentioned McKinney patent.

In considering the operation of the apparatus, the float 15 will be buoyed up by the liquid 12 and the position of the float will be determined by the indicating mechanism 19 in the manner set forth in the above mentioned McKinney patent. In the absence of any correcting signal, the indicator 20 will indicate directly the height of the liquid in the tank. It should be noted that the float 15 will rise and fall in the fluent material 11 in accordance with the density of the fluid so that the actual level of the surface 12 upon the float 15 will vary with the density of the fluent material. Thus, even though the liquid level in the tank 10 as evidenced by the surface 12 should remain stationary, the float level may rise and fall due to the change in the material density. With the normal type of surface follower of the float type, the indicator associated therewith will indicate that there has been an actual change in liquid level while in fact this is not actually the case.

By adding the second fluid level measuring device 22 to the float 15, it is possible to measure the actual height of the fluent material on the float. This will supply a correcting signal to the indicator 19 which will eliminate the error due to the change in the position of the float resulting from density.

As viewed in Fig. 3, the motor 25 will normally adjust the ring gear 28 to follow the direct position of the float 15. As long as the planetary gear system 29 remains stationary, the motion of the ring gear will be transmitted directly to the sun gear 32 and the indicator 20 will directly indicate the positioning of the float 15. However, in the event that the density of the fluent material should change, the relative height of the liquid on the float 15 will be detected and the electrical signal from the vernier or secondary level measuring device 22 will be fed through the cables 23 and 39 to the amplifier 38 and thence to the motor 35. The motor 35 will operate through the gears 36, 37, and drive gear 31 to adjust the planetary gears 29. The adjustment of the planetary gears 29 will result in a correcting of adjustments of the indicator 20 so that the indicator will read the true level of the surface 12 within the tank 10.

It will thus be seen that there has been provided a new and novel means for determining the exact level of the surface of a fluent material by means of a primary level sensing means and a secondary sensing means which acts as a vernier on the primary sensing means.

While, in accordace with the provisions of the statutes, there has been illustrated and described the best forms of the embodiments of the invention known, it will be apparent to those skilled in the art that changes may be made in the forms of the apparatus without departing from the spirit of the invention as set forth in the appended claims, and that in some cases certain features of the invention may be used to advantage without a corresponding use of other features.

Having now described my invention, what I claim as new and desire to secure by Letters Patent is:

1. Apparatus for measuring the level of a fluent material, including first means responsive to the level and to the density of said fluent material, second means positioned by said first means and operative to respond to the level of said fluent material on said first means, a planetary gear system having one input movable in response to said first means and a second input movable in response to said second means, and an indicator connected to the output of said planetary gear system and movable in response to the algebraic sum of the movements of said inputs.

2. Apparatus for measuring the level of fluent material, including, a float, flexible supporting means for said float, a drum about which said flexible supporting means is wound, a motor applying a torque to said drum urging it to wind up said flexible supporting means to maintain said float in a position of equilibrium in which it is partially submerged in a surface of said fluent material and partially supported by the buoyancy of said material, means mounted on and positioned by said float for compensating for variations in the buoyant effect of said fluent material on said float, a planetary gear mechanism responsive to the position of said float and to the variations in the buoyant effect of said fluent material on said float as sensed by said means, and an indicator movable by said planetary gear mechanism in response to the position of said float and to the position of said means so as to indicate the level of said material.

3. Apparatus for measuring the level of fluent material, including, a float, flexible supporting means for said float, a drum about which said flexible supporting means is wound, a first motor applying a torque to said drum urging it to wind up said flexible supporting means to maintain said float in a position of equilibrium in which it is partially submerged in a surface of said fluent material and partially supported by the buoyancy of said material, means mounted on and positioned by said float for compensating for variations in the buoyant effect of said fluent material on said float, a second motor movable in response to variations in the buoyant effect of said fluent material on said float as sensed by said means, a planetary gear mechanism having one input responsive to said first motor and a second input responsive to said second motor, and an indicator movable by the output of said planetary gear mechanism in response to the movements of said first motor and of said second motor.

4. Apparatus for measuring the level of fluent material, including, a float, flexible supporting means for said float, a drum about which said flexible supporting means is wound, a first motor applying a torque to said drum urging it to wind up said flexible supporting means to maintain said float in a position of equilibrium in which it is partially submerged in a surface of said fluent material and partially supported by the buoyancy of said material, means for compensating for variations in the buoyant effect of said fluent material on said float comprising a capacity-type of level-measuring device, an electrical cable forming part of said flexible supporting means and having its input in said level measuring device, an amplifier connected to the output of said electrical cable, an electric motor connected under the control of said amplifier, a planetary gear mechanism responsive to the movement of said first motor and to the movement of said second motor, and an indicator movable by the output of said planetary gear mechanism in response to the movements of said first motor and of said second motor.

5. Apparatus for measuring the level of fluent material, including: a float; first electrically operated, force-transmitting means including flexible supporting means for said float applying a force to said float to maintain said float in a position of equilibrium in which it is partially submerged in a surface of said fluent material and partially supported by the buoyancy of said material; means for compensating for variations in the buoyant effect of said fluent material on said float including a second electrically operated, force-transmitting means including a capacity-type of level measuring device mounted on and positioned by said float and an electric cable forming part of said flexible supporting means and having its input in said level measuring device; a planetary gear mechanism responsive to the movements of said first and of said second electrically operated force-transmitting means; and an indicator movable by the output of said planetary gear mechanism in response to said movements.

References Cited in the file of this patent

UNITED STATES PATENTS

| | | |
|---|---|---|
| 1,788,465 | Lamar | Jan. 13, 1931 |
| 2,110,490 | Renner | Mar. 8, 1938 |
| 2,563,280 | Schafer | Aug. 7, 1951 |
| 2,629,261 | McKinney | Feb. 24, 1953 |
| 2,724,273 | Sontheimer | Nov. 22, 1955 |
| 2,728,035 | Meredith | Dec. 20, 1955 |

FOREIGN PATENTS

| | | |
|---|---|---|
| 700,499 | Great Britain | Dec. 2, 1953 |